United States Patent
Ahn et al.

(10) Patent No.: US 9,983,732 B2
(45) Date of Patent: May 29, 2018

(54) TOUCH SENSING DEVICE CAPABLE OF SELECTIVELY ATTENUATING NOISE AND CONTROL DEVICE THEREOF

(71) Applicant: SILICON WORKS CO., LTD., Daejeon-si (KR)

(72) Inventors: Yong Sung Ahn, Ansan-si (KR); Jung Min Choi, Daejeon-si (KR); Sun Young Park, Incheon-si (KR); Jong Hwa Lee, Seoul (KR); Gyeong Hwan Kim, Seongnam-si (KR)

(73) Assignee: SILICON WORKS CO., LTD., Daejeon-si (KR)

( * ) Notice: Subject to any disclaimer, the term of this patent is extended or adjusted under 35 U.S.C. 154(b) by 350 days.

(21) Appl. No.: 14/807,048

(22) Filed: Jul. 23, 2015

(65) Prior Publication Data
US 2016/0026335 A1    Jan. 28, 2016

(30) Foreign Application Priority Data

Jul. 23, 2014   (KR) .................. 10-2014-0093026

(51) Int. Cl.
G06F 3/041    (2006.01)
G09G 5/18     (2006.01)
G06F 3/044    (2006.01)

(52) U.S. Cl.
CPC ............ G06F 3/0418 (2013.01); G06F 3/044 (2013.01); G09G 5/18 (2013.01)

(58) Field of Classification Search
None
See application file for complete search history.

(56) References Cited

U.S. PATENT DOCUMENTS

| | | | | |
|---|---|---|---|---|
| 6,950,109 B2* | 9/2005 | Deering | ................ | G06F 3/1431 345/589 |
| 7,420,386 B2* | 9/2008 | Wang | .................. | G11C 7/1048 326/30 |
| 8,890,841 B2* | 11/2014 | Rebeschi | .............. | G06F 3/0418 345/156 |
| 9,104,273 B1* | 8/2015 | Olson | ..................... | G06F 3/044 |
| 9,195,353 B2* | 11/2015 | Byun | ...................... | G06F 3/044 |
| 9,285,902 B1* | 3/2016 | Kremin | .................... | G06F 3/044 |
| 9,715,319 B2* | 7/2017 | Marques | ................ | G06F 3/044 |
| 2007/0262966 A1* | 11/2007 | Nishimura | ............. | G06F 3/044 345/173 |

(Continued)

FOREIGN PATENT DOCUMENTS

| KR | 10-2011-0061798 | 6/2011 |
|---|---|---|
| KR | 10-1239103 | 3/2013 |

(Continued)

*Primary Examiner* — Kent W Chang
*Assistant Examiner* — Nathaniel P Brittingham
(74) *Attorney, Agent, or Firm* — Kile Park Reed & Houtteman PLLC

(57) ABSTRACT

A touch sensing device may include: a pre-processing unit configured to reduce common signal noise and frequency components higher than a preset cut-off frequency from a pair of signals outputted from a touch panel, in response to a driving signal; and an attenuation unit configured to attenuate a frequency of a preset frequency region in an output signal of the pre-processing unit, and output a sensing signal.

14 Claims, 10 Drawing Sheets

(56) References Cited

U.S. PATENT DOCUMENTS

| | | | |
|---|---|---|---|
| 2009/0153152 A1* | 6/2009 | Maharyta | G01R 27/2605 324/684 |
| 2010/0328256 A1* | 12/2010 | Harada | G06F 3/044 345/174 |
| 2011/0001492 A1* | 1/2011 | Nys | H03M 1/123 324/658 |
| 2011/0063993 A1* | 3/2011 | Wilson | G06F 3/044 370/254 |
| 2011/0084857 A1* | 4/2011 | Marino | G06F 3/044 341/5 |
| 2011/0157067 A1* | 6/2011 | Wagner | G06F 3/0416 345/174 |
| 2011/0163992 A1* | 7/2011 | Cordeiro | G06F 3/0416 345/174 |
| 2011/0261007 A1* | 10/2011 | Joharapurkar | G06F 3/0418 345/174 |
| 2012/0062499 A1* | 3/2012 | Weaver | G06F 3/03545 345/174 |
| 2012/0139868 A1* | 6/2012 | Mamba | G06F 3/044 345/174 |
| 2012/0200524 A1 | 8/2012 | Vallis et al. | |
| 2012/0256638 A1 | 10/2012 | Van Antwerpen et al. | |
| 2013/0009905 A1* | 1/2013 | Castillo | G06F 3/044 345/174 |
| 2013/0106779 A1* | 5/2013 | Company Bosch | G06F 3/0418 345/174 |
| 2013/0141139 A1 | 6/2013 | Ballan et al. | |
| 2013/0141372 A1* | 6/2013 | Kang | G06F 3/041 345/173 |
| 2013/0147758 A1* | 6/2013 | Chang | G06F 3/0416 345/174 |
| 2013/0207906 A1* | 8/2013 | Yousefpor | G06F 3/0418 345/173 |
| 2013/0300692 A1* | 11/2013 | Jang | G06F 3/044 345/173 |
| 2014/0267129 A1* | 9/2014 | Rebeschi | G06F 3/0418 345/174 |
| 2014/0306913 A1* | 10/2014 | Krah | G06F 3/0416 345/173 |
| 2015/0103042 A1* | 4/2015 | Lee | G06F 3/0418 345/174 |
| 2015/0180493 A1* | 6/2015 | Liu | H02M 3/06 324/686 |
| 2015/0212643 A1* | 7/2015 | Lee | G06F 3/044 345/174 |
| 2015/0268792 A1* | 9/2015 | Hamaguchi | G06F 3/044 345/174 |
| 2015/0277660 A1* | 10/2015 | Yang | G06F 3/0418 345/173 |
| 2015/0293621 A1* | 10/2015 | Singh | G06F 3/0418 345/173 |
| 2015/0293636 A1* | 10/2015 | Park | G06F 3/0418 345/174 |
| 2015/0338955 A1* | 11/2015 | Hamaguchi | G06F 3/044 345/174 |
| 2015/0346862 A1* | 12/2015 | Schwartz | G06F 3/0418 345/174 |
| 2016/0190987 A1* | 6/2016 | Bohannon | G06F 3/0416 345/174 |
| 2017/0003810 A1* | 1/2017 | Byun | G06F 3/044 |
| 2017/0123551 A1* | 5/2017 | Li | G06F 3/0416 |

FOREIGN PATENT DOCUMENTS

| | | |
|---|---|---|
| KR | 10-2013-0107275 | 10/2013 |
| KR | 10-1350673 | 1/2014 |

* cited by examiner

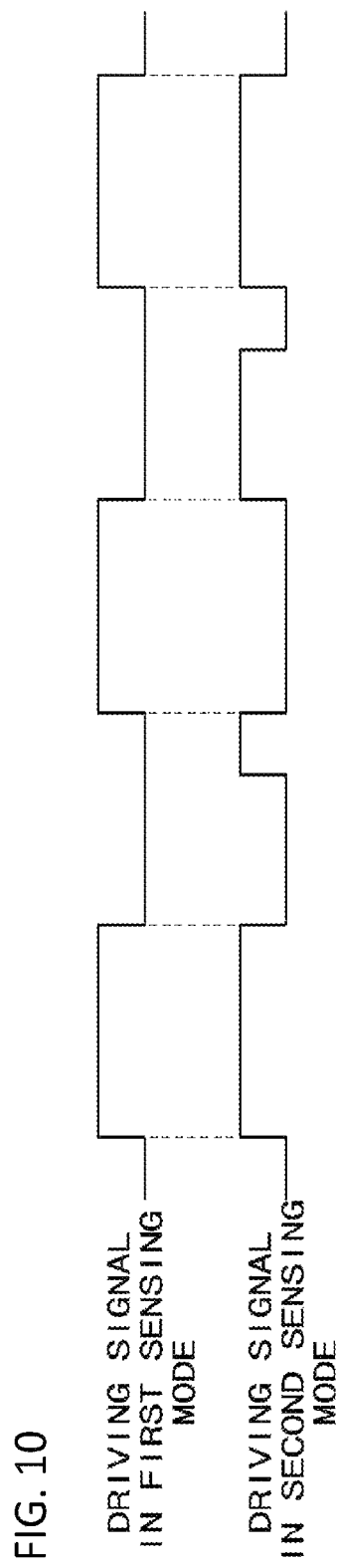

TOUCH SENSING DEVICE CAPABLE OF SELECTIVELY ATTENUATING NOISE AND CONTROL DEVICE THEREOF

BACKGROUND

1. Technical Field

The present disclosure relates to a touch panel, and more particularly, to a touch sensing device and a control device thereof.

2. Related Art

Most of display panels used in mobile devices employ a touch function.

A display device of a mobile device is implemented with a flat display panel such as an LCD panel or OLED panel, and a touch panel for embodying a touch function is combined with a flat panel through an add-on method, an on-cell method, or an in-cell method.

The touch panel indicates a transparent switch panel which can detect a user touching a region at which a text, image, or icon of the display panel is displayed, and provide a sensing signal for operating a device or executing a program.

Such a touch panel receives a driving signal for recognizing whether the user's touch occurred, and detects the driving signal to determine whether the user's touch occurred, based on the change of the driving signal.

However, when noise having an unspecified frequency is applied to the touch panel, interference may occur between the frequencies of the driving signal and a received signal in the touch panel. Then, the touch panel may not precisely recognize whether the user's touch occurred, that is, an error may occur.

Conventionally, the interference has been avoided through frequency hopping for the driving signal and the received signal of the touch panel.

However, when the frequencies of the driving signal and the received signal in the touch panel are hopped, a base-level signal of the touch panel may be changed, or signal interference with other systems such as WiFi, 3G/LTE, and Bluetooth may occur.

SUMMARY

Various embodiments are directed to a touch sensing device capable of not only reducing low-frequency noise lower than a driving signal of a touch panel but also attenuating noise having a higher frequency than the driving signal, and a control device thereof.

Also, various embodiments are directed to a touch sensing device capable of selectively attenuating noise having an even multiple frequency and an odd multiple frequency of a driving signal of a touch panel, and a control device thereof.

Also, various embodiments are directed to a touch sensing device capable of accurately recognizing whether a user's touch occurred, and a control device thereof.

In an embodiment, a touch sensing device may include: a pre-processing unit configured to reduce common signal noise and frequency components higher than a preset cut-off frequency from a pair of signals outputted from a touch panel, in response to a driving signal; and an attenuation unit configured to attenuate a frequency of a preset frequency region in an output signal of the pre-processing unit, and output a sensing signal.

In another embodiment, a touch sensing device may include: a common signal noise reduction unit configured to reduce common signal noise from a pair of signals outputted from a touch panel in response to a driving signal; a high frequency reduction unit configured to reduce frequency components higher than a preset cut-off frequency from an output signal of the common signal noise reduction unit; and an even multiple frequency attenuation unit configured to attenuate a frequency having an even multiple relation with the frequency of the driving signal from an output signal of the high frequency reduction unit.

In another embodiment, a control device of a touch sensing device may include: a touch panel configured to output a received signal in response to a driving signal; a touch sensing unit configured to attenuate a frequency of a preset frequency region from the received signal according to a sensing control signal, and output a sensing signal; a touch panel driving unit configured to apply the driving signal to the touch panel according to a driving control signal; and a control unit configured to provide the driving control signal for changing the phase of the driving signal to the touch panel driving unit, and provide the sensing control signal to the touch sensing unit.

BRIEF DESCRIPTION OF THE DRAWINGS

FIG. 10 is a diagram illustrating the phase changes of touch panel driving signals in accordance with the embodiment of the present invention.

DETAILED DESCRIPTION

Figure 1:
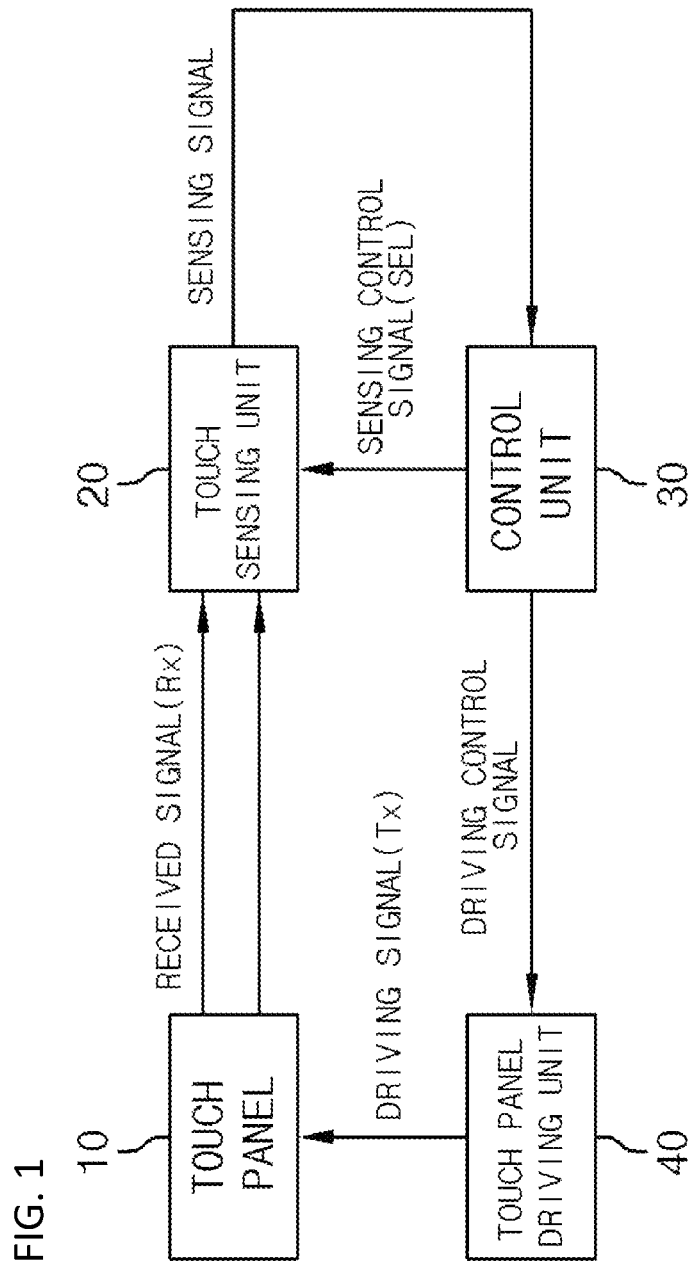
FIG. 1 is a block diagram illustrating the configuration of a touch panel sensing control device in accordance with an embodiment of the present invention.

Exemplary embodiments will be described below in more detail with reference to the accompanying drawings. The disclosure may, however, be embodied in different forms and should not be constructed as limited to the embodiments set forth herein. Rather, these embodiments are provided so that this disclosure will be thorough and complete, and will fully convey the scope of the disclosure to those skilled in the art. Throughout the disclosure, like reference numerals refer to like parts throughout the various figures and embodiments of the disclosure.

FIG. 1 is a block diagram illustrating the configuration of a touch panel sensing control device in accordance with an embodiment of the present invention.

Referring to FIG. 1, the touch panel sensing control device in accordance with the embodiment of the present invention may include a touch panel 10, a touch sensing unit 20, a control unit 30, and a touch panel driving unit 40.

The touch panel 10 may include a plurality of driving lines (not illustrated) and a plurality of sensing lines (not illustrated). The driving lines and the sensing lines may be formed in various manners according to a designer's intention. The driving lines and the sensing lines may be arranged to intersect each other or arranged in parallel to each other and form capacitors for touch sensing.

The touch panel 10 may output a pair of received signals Rx to the touch sensing unit 20 in response to a driving signal Tx applied from the touch panel driving unit 40. When a touch occurs on the touch panel 10, the received signals Rx may be changed according to a change in capacitance of the position at which the touch occurred, that is, the touch region.

The touch sensing unit 20 may remove common signal noise and a frequency component higher than a preset cut-off frequency from the pair of received signals Rx outputted from the touch panel 10 in response to the driving signal Tx.

The touch sensing unit 20 may attenuate the frequency of a preset frequency region in the received signals Rx according to a sensing control signal SEL of the control unit 30, and output a sensing signal.

The frequency region may be set to a high-frequency region having a higher frequency than the driving signal Tx.

Furthermore, the frequency region may be set to a frequency region having a multiple relation, such as an integer multiple, a real number multiple, or ½, with the frequency of the driving signal Tx.

In the embodiment of the present invention, the case in which a frequency having an even multiple relation with the frequency of the driving signal Tx and a frequency having an odd multiple relation with the frequency of the driving signal Tx are attenuated will be taken as an example for description. Hereafter, the frequency having an even multiple relation with the frequency of the driving signal Tx will be referred to as an even multiple frequency, and the frequency having an odd multiple relation with the frequency of the driving signal Tx will be referred to as an odd multiple frequency.

The configuration of the touch sensing unit 20 will be described in detail below with reference to FIG. 2.

The touch panel driving unit 40 may apply the driving signal Tx to the touch panel 10 according to a driving control signal of the control unit 30.

The control unit 30 may analyze the sensing signal of the touch sensing unit 20, and output the driving control signal to the touch panel driving unit 40, the driving control signal determining whether to change the phase of the driving signal Tx according to the analysis result.

Furthermore, the control unit 30 may provide the sensing control signal SEL to the touch sensing unit 20, the sensing control signal SEL determining whether to attenuate the even multiple frequency of the driving signal Tx or both of the even multiple frequency and odd multiple frequency of the driving signal Tx.

Furthermore, after the even multiple frequency and odd multiple frequency of the driving signal Tx are attenuated, it may be determined that noise interference still exists, through sensing signal analysis. In this case, the control unit 30 may attenuate noise by further changing the frequency $f_{Tx}$ of the driving signal and a sampling frequency $f_s$.

The operation of the touch panel sensing control device in accordance with the embodiment of the present invention will be described as follows.

First, the control unit 30 may control the touch panel driving unit 40 to apply the driving signal Tx to the touch panel 10. Then, received signals Rx of the touch panel 10 may be inputted to the touch sensing unit 20.

At this time, the control unit 30 may analyze a sensing signal outputted from the touch sensing unit 20.

When the analysis result for the sensing signal indicates that noise interference corresponding to an even multiple of the driving signal frequency Ftx occurred, the control unit 30 may control the touch sensing unit 20 to attenuate the even multiple frequency of the driving signal Tx.

Furthermore, when noise interference corresponding to an odd multiple of the driving signal frequency Ftx occurred, the control unit 30 may change the phase of the driving signal Tx, and control the touch sensing unit 20 to attenuate the odd multiple frequency of the driving signal Tx.

As such, the control unit 30 may analyze the sensing signal during the operation of the touch sensing unit 20, and provide the driving control signal to the touch panel driving unit, the driving control signal determining whether to change the phase of the driving signal Tx according to the analysis result. Furthermore, the control unit 30 may provide the sensing control signal SEL to the touch sensing unit 20, the sensing control signal SEL determining whether to attenuate the even multiple frequency of the driving signal Tx or both of the even multiple frequency and the odd multiple frequency of the driving signal Tx.

Figure 2:
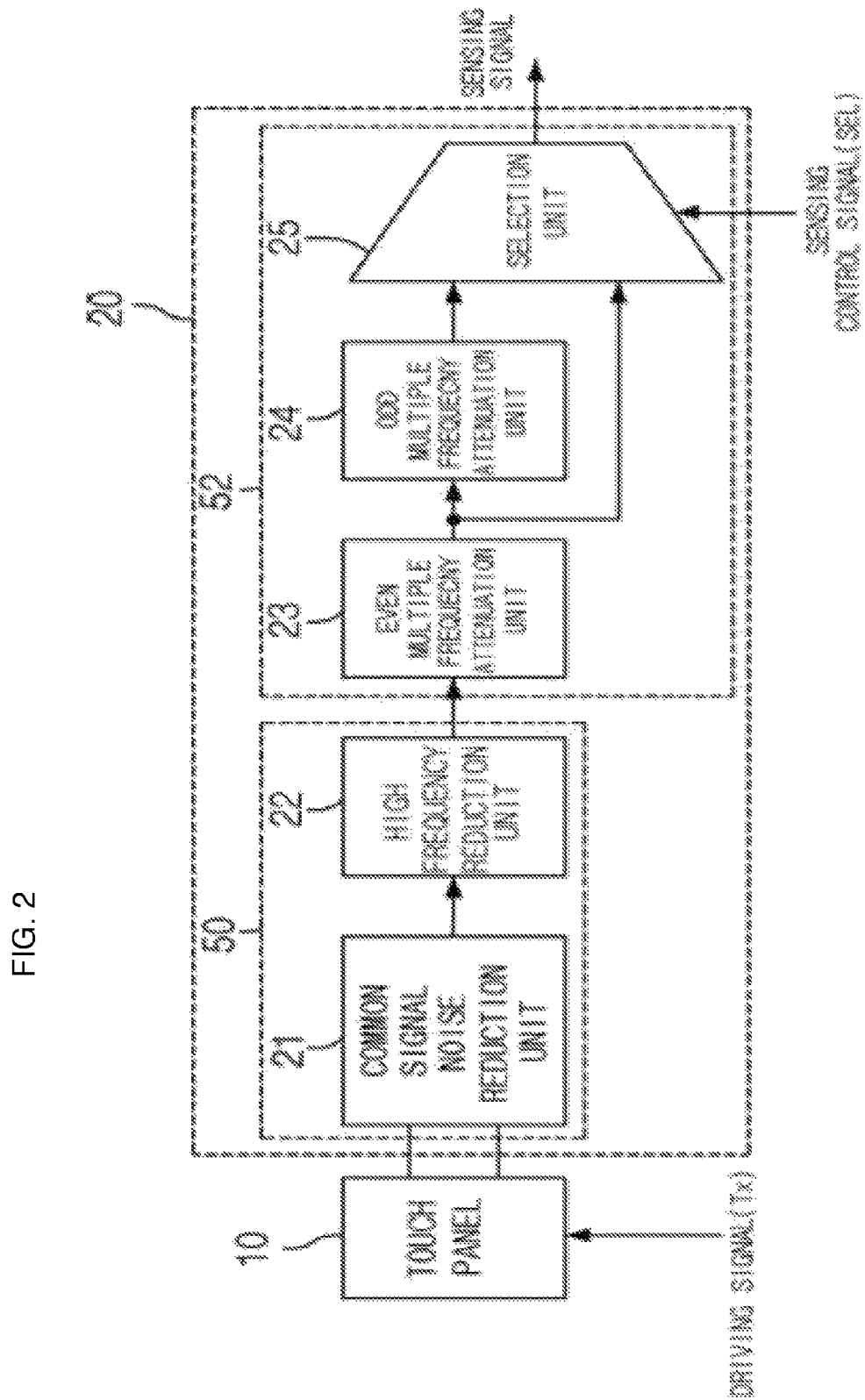
FIG. 2 is a block diagram illustrating the configuration of the touch sensing device in accordance with the embodiment of the present invention.
Figure 3:
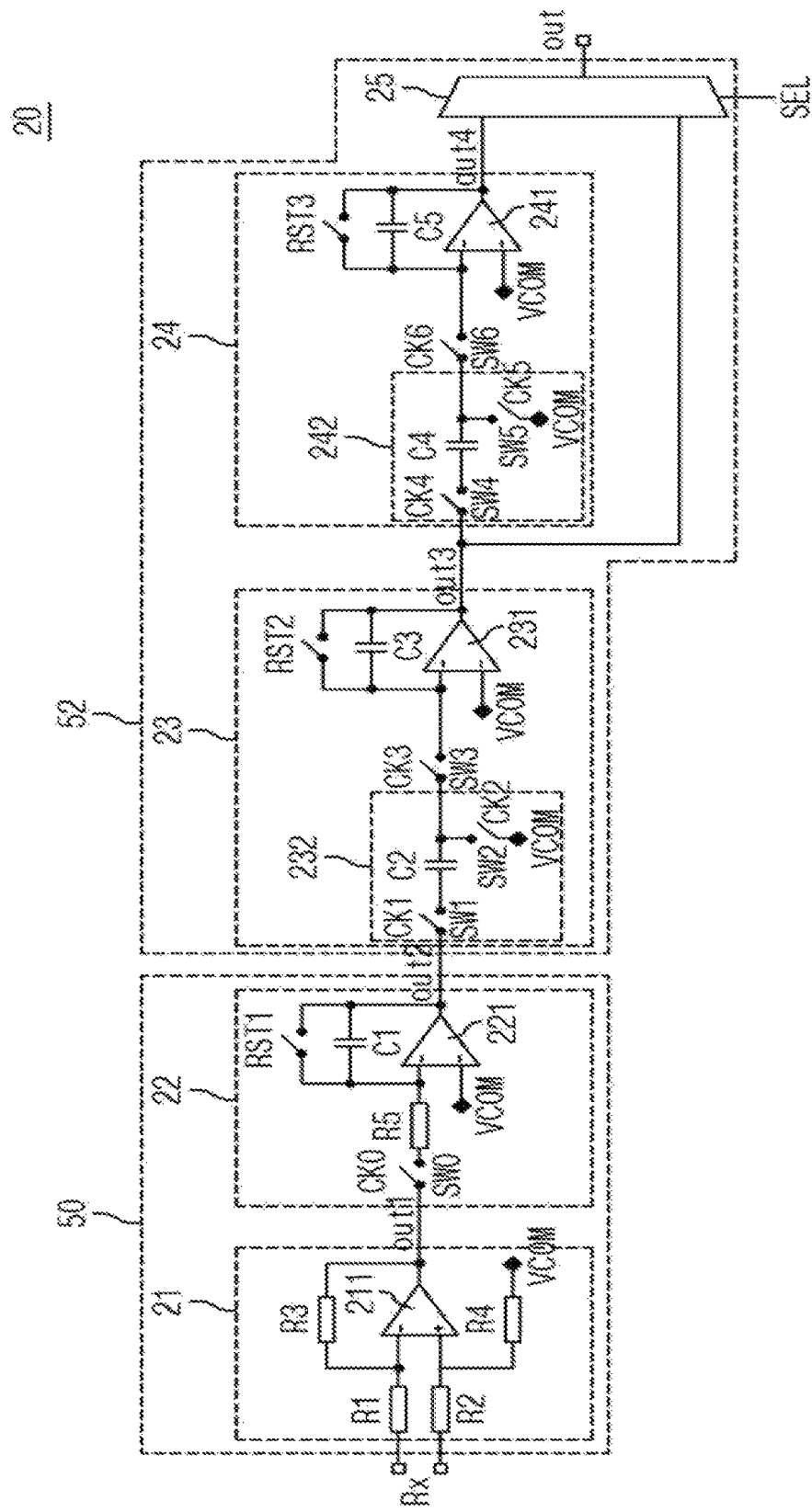
FIG. 3 is a circuit diagram of the touch sensing unit in accordance with the embodiment of the present invention.

FIG. 2 is a block diagram illustrating the configuration of the touch sensing device in accordance with the embodiment of the present invention, and FIG. 3 is a circuit diagram of the touch sensing unit in accordance with the embodiment of the present invention.

Referring to FIGS. 2 and 3, the touch sensing device in accordance with the embodiment of the present invention may include a common signal noise reduction unit 21, a high frequency reduction unit 22, an even multiple frequency attenuation unit 23, an odd multiple frequency attenuation unit 24, and a selection unit 25.

The common signal noise reduction unit 21 may receive a pair of received signals Rx having a differential relation and outputted from the touch panel 10 in response to the driving signal Tx, and transmit changes of the received signals Rx to the high frequency reduction unit 22.

The common signal noise reduction unit 21 may include a differential amplifier 211 having a differential type, and reduce common signal noise from the pair of received signals Rx outputted from the touch panel 10. Furthermore, the common signal noise reduction unit 21 may include a high-pass filter such as a differentiator to reduce low-frequency components.

The high frequency reduction unit 22 may sample an output signal of the common signal noise reduction unit 21, and reduce a frequency component higher than a preset cut-off frequency.

The high frequency reduction unit 22 may include a sampling switch SW0, an amplifier 221, and a reset switch RST1. The sampling switch SW0 may sample an output signal OUT1 of the common signal noise reduction unit 21 according to a clock signal CK0. The amplifier 221 may reduce a frequency component higher than the cut-off frequency from an output signal of the sampling switch SW0, the cut-off frequency being set by the resistance of an input resistor R5 and the capacitance of a feedback capacitor C1. The reset switch RST1 may reset charge stored in the feedback capacitor C1.

Furthermore, the high frequency reduction unit 22 may be implemented with a high-pass filter such as an integrator to reduce a high frequency component.

The even multiple frequency attenuation unit 23 may perform CDS (Correlated Double Sampling) on an output signal OUT2 of the high frequency reduction unit 22, reduce low-frequency noise lower than the frequency of the driving signal Tx, and attenuate a frequency corresponding to an even multiple of the frequency of the driving signal Tx.

The even multiple frequency attenuation unit 23 may include a CDS unit 232, an amplifier 231, and a reset switch RST2. The CDS unit 232 may reduce low-frequency noise lower than the frequency of the driving signal Tx by performing CDS on the output signal OUT2 of the high frequency reduction unit 22 according to first and second clock signals CK1 and CK2, and attenuate a frequency corresponding to an even multiple of the driving signal Tx. The amplifier 231 may attenuate white noise by accumulating an output signal of the CDS unit 232 in a feedback capacitor C3 according to a third clock signal CK3. The reset switch RST2 may reset the charge stored in the feedback capacitor C3.

The CDS unit 232 may include a first sampling switch SW1, a second sampling switch SW2, and an input capacitor C2. The first sampling switch SW1 may have one terminal connected to the output stage of the high frequency reduction unit 22 and switch according to the first clock signal CK1. The second sampling switch SW2 may have one terminal connected to an internal power supply VCOM and switch according to the second clock signal CK2. The input capacitor C2 may have one terminal connected to the other terminal of the first sampling switch SW1 and the other terminal connected to the other terminal of the second sampling switch SW2, and accumulate an output signal of the high frequency reduction unit 22 when the first and second clock signals CK1 and CK2 are enabled.

The odd multiple frequency attenuation unit 24 may reduce low-frequency noise lower than the frequency of the driving signal Tx by performing CDS on an output signal OUT3 of the even multiple frequency attenuation unit 23, and attenuate a frequency corresponding to an odd multiple of the frequency of the driving signal Tx.

The odd multiple frequency attenuation unit 24 may include a CDS unit 242, an amplifier 241, and a reset switch RST3. The CDS unit 242 may reduce low-frequency noise lower than the frequency of the driving signal Tx by performing CDS on the output signal OUT3 of the even multiple frequency attenuation unit 23 according to fourth and fifth clock signals CK4 and CK5, and attenuate a frequency corresponding to an even multiple of the driving signal Tx. The amplifier 241 may attenuate white noise by accumulating an output signal of the CDS unit 242 in the feedback capacitor C5 according to a sixth clock signal CK6. The reset switch RST3 may reset charge stored in the feedback capacitor C5.

The CDS unit 242 may include a fourth sampling switch SW4, a fifth sampling switch SW5, and an input capacitor C4. The fourth sampling switch SW4 may have one terminal connected to the output stage of the even multiple frequency attenuation unit 23 and switch according to the fourth clock signal CK4. The fifth sampling switch SW5 may have one terminal connected to the internal power supply VCOM and switch according to the fifth clock signal CK5. The input capacitor C2 may have one terminal connected to the other terminal of the fourth sampling switch SW4 and the other terminal connected to the other terminal of the fifth sampling switch SW5, and accumulate the output signal OUT3 of the even multiple frequency attenuation unit 23 when the fourth and fifth clock signals CK4 and CK5 are enabled.

The selection unit 25 may select any one of the output signal OUT3 of the even multiple frequency attenuation unit 23 or the output signal OUT4 of the odd multiple frequency attenuation unit 24 according to the sensing control signal SEL, and output the selected signal as a sensing signal.

The sensing control signal SEL may determine whether to attenuate the even multiple frequency of the driving signal Tx or both of the even multiple frequency and the odd multiple frequency of the driving signal Tx.

In the embodiment of the present invention, the control unit 30 illustrated in FIG. 1 may analyze a sensing signal during operation of the touch sensing unit 20, and provide the sensing control signal SEL to the touch sensing unit 20 according to the analysis result.

In the embodiment of the present invention, the sensing control signal SEL may have a value changed by reflecting a result obtained by noise interference into the sensing noise. However, the sensing control signal SEL may have a preset value.

The phase of the driving signal Tx applied to the touch panel 10 may be controlled in such a manner that the output signals of the even multiple frequency attenuation unit 23 and the odd multiple frequency attenuation unit 24 have an integrated value corresponding to inputs.

In the embodiment of the present invention, the phase control for the driving signal may be performed in such a manner that the control unit 30 provides the driving control signal for changing the phase of the driving signal Tx to the touch panel driving unit 40 in response to the result obtained by determining the sensing signal, or changes the phase of the driving signal Tx in response to a preset value. In another embodiment of the present invention, the touch sensing device may include a pre-processing unit 50 and an attenuation unit 52.

Referring to FIGS. 2 and 3, the pre-processing unit 50 may perform a band-pass filtering operation on the received signals Rx through a combination of the common signal noise reduction unit 21 and the high frequency reduction unit 22.

The attenuation unit 52 may attenuate high-frequency noise higher than the frequency of the touch panel driving signal Tx through a combination of an even multiple frequency attenuation unit 23 for attenuating the even multiple frequency of the driving signal Tx and the odd multiple frequency attenuation unit 24 for attenuating an odd multiple frequency of the driving signal Tx.

Figure 4:
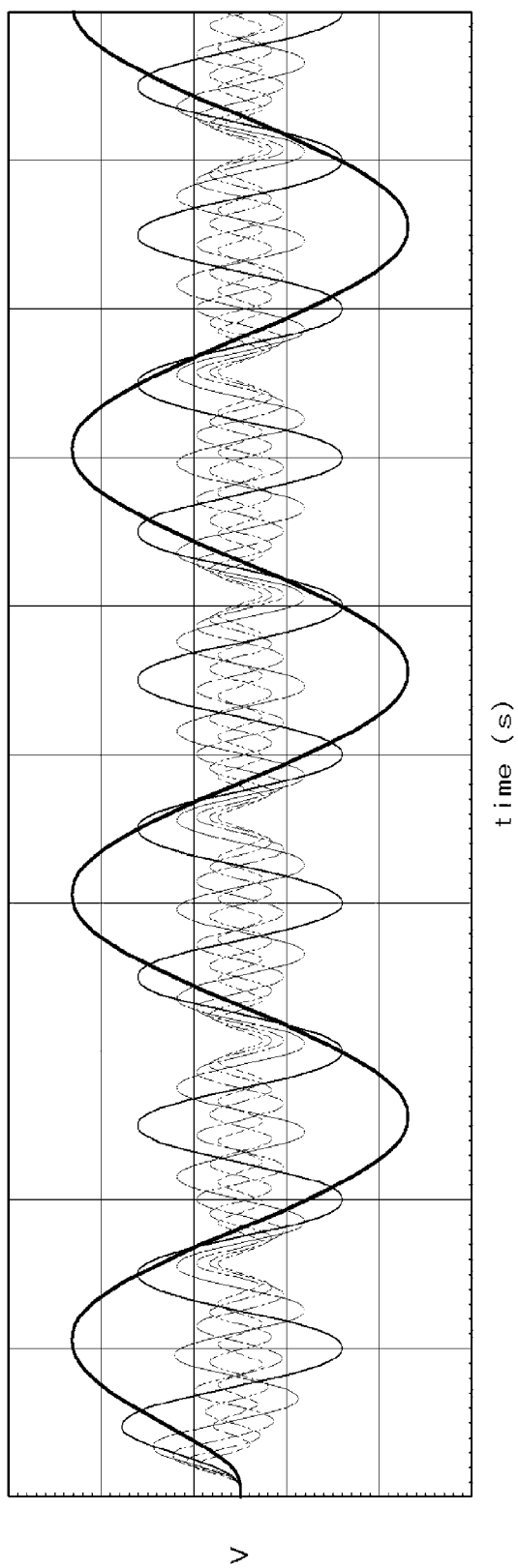
FIG. 4 is a diagram illustrating the result of a frequency attenuation simulation by a common signal noise reduction unit and a high frequency reduction unit of FIG. 3.

FIG. 4 is a diagram illustrating the result of a frequency attenuation simulation by the common signal noise reduction unit and the high frequency reduction unit of FIG. 3.

Referring to FIGS. 3 and 4, the common signal noise reduction unit 21 of the touch sensing unit 20 may receive a pair of received signals Rx from the touch panel 10, and transmit changes of the received signals Rx to the high frequency reduction unit 22. At this time, the common signal noise reduction unit 21 may include the differential amplifier 211 having a differential type, and reduce common signal noise of the two signals inputted from the touch panel 10.

Then, the high frequency reduction unit 22 may sample the output signal OUT1 of the common signal noise reduction unit 21 according to the clock signal CK0, and reduce frequency components higher than the cut-off frequency set by the resistance of an input resistor R5 and the capacitance of the feedback capacitor C1.

The simulation result of FIG. 4 shows that common signal noise is reduced through the common signal noise reduction unit 21 and frequency components higher than the cut-off frequency are reduced by the high frequency reduction unit 22.

As illustrated in FIG. 4, however, high-frequency noise having a higher frequency than the touch panel driving signal still exists.

Thus, the touch sensing device in accordance with the embodiment of the present invention may attenuate high-frequency noise having a higher frequency than the driving signal of the touch panel 10 through the even multiple frequency attenuation unit 23 for attenuating the even multiple frequency of the driving signal Tx and the odd multiple frequency attenuation unit 24 for attenuating the odd multiple frequency of the driving signal Tx.

The operations of the even multiple frequency attenuation unit 23 and the odd multiple frequency attenuation unit 24 will be described as follows.

Figure 5:
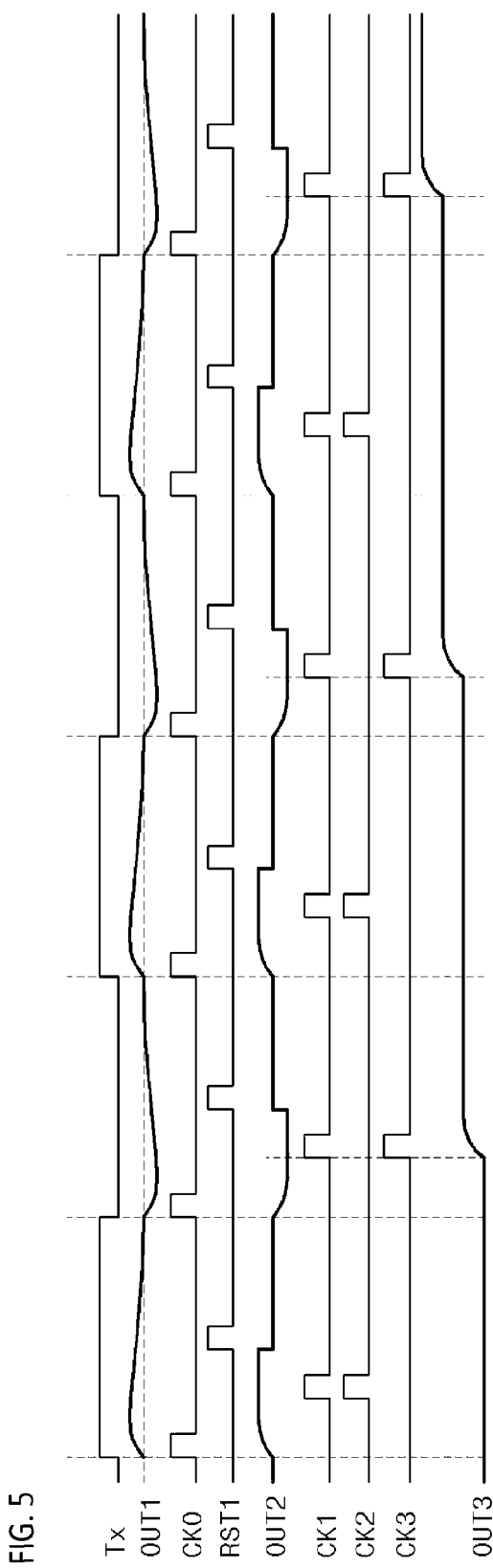
FIG. 5 is a timing diagram when an output signal of an even multiple frequency attenuation of FIG. 3 is outputted as a sensing signal.

FIG. 5 is a timing diagram when an output signal of the even multiple frequency attenuation of FIG. 3 is outputted as a sensing signal (hereafter, referred to as 'first sensing mode').

The first sensing mode is an operation mode in which when the interference of noise corresponding to an even multiple of the driving signal frequency $f_{Tx}$ occurs, the output signal OUT3 of the even multiple frequency attenuation unit 23 is selected and outputted as the sensing signal OUT.

Referring to FIGS. 3 and 5, when the touch panel driving signal Tx is applied to the touch panel 10 illustrated in FIG. 2, the common signal noise reduction unit 21 may receive a pair of received signals Rx from the touch panel 10, and output the output signal OUT1 corresponding to changes of the received signals Rx to the high frequency reduction unit 22.

Then, when the clock signal CK0 is applied, the high frequency reduction unit 22 may sample the output signal OUT1 of the common signal noise reduction unit 21, and charge the feedback capacitor C1.

At this time, the high frequency reduction unit 22 may reduce frequency components higher than the cut-off frequency set by the resistance of the input resistor R5 and the capacitance of the feedback capacitor C1 from the output signal OUT1, and output an output signal OUT2 to the even multiple frequency attenuation unit 23. The charge stored in the feedback capacitor C1 of the high frequency reduction unit 22 may be reset when the reset switch RST1 is enabled.

Then, when the first and second clock signals CK1 and CK2 are applied, the even multiple frequency attenuation unit 23 may reduce low-frequency noise lower than the frequency of the driving signal Tx by performing CDS on the output signal OUT2 of the high frequency reduction unit 22, and attenuate a frequency corresponding to an even multiple of the driving signal Tx.

Then, when the third clock signal CK3 is applied, the even multiple frequency attenuation unit 23 may accumulate the double-sampled signals in the feedback capacitor C3, and output the output signal OUT3 to the selection unit 25.

Then, the selection unit 25 may select and output the output signal OUT3 of the even multiple frequency attenuation unit 23 as a sensing signal OUT.

Figure 6:
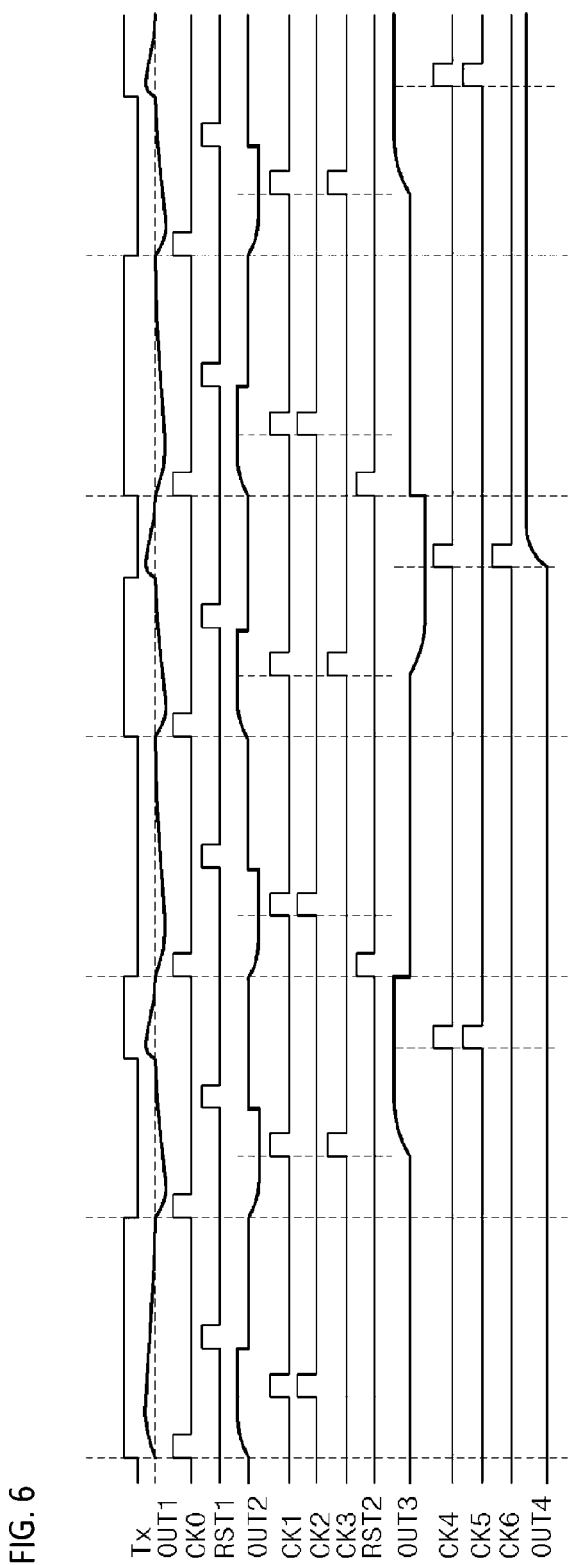
FIG. 6 is a timing diagram when an output signal of an odd multiple frequency attenuation of FIG. 3 is outputted as a sensing signal.

FIG. 6 is a timing diagram when an output signal of the odd multiple frequency attenuation of FIG. 3 is outputted as a sensing signal (hereafter, referred to as 'second sensing mode').

The second sensing mode is an operation mode in which when the interference of noise corresponding to an odd multiple of the driving signal frequency $f_{Tx}$ occurs, the output signal OUT4 of the odd multiple frequency attenuation unit 24 is selected and outputted as a sensing signal OUT.

Referring to FIGS. 3 and 6, when the first sensing mode is switched to the second sensing mode, the phase of the driving signal Tx may be changed (refer to FIG. 10).

When the touch panel driving signal Tx of which the phase is changed is applied to the touch panel 10 illustrated in FIG. 2, the common signal noise reduction unit 21 may receive a pair of received signals Rx from the touch panel 10, and output an output signal OUT1 corresponding to changes of the received signals Rx to the high frequency reduction unit 22.

Then, when the clock signal CK0 is applied, the high frequency reduction unit 22 may sample the output signal OUT1 of the common signal noise reduction unit 21, and charge the feedback capacitor C1.

At this time, the high frequency reduction unit 22 may reduce frequency components higher than the cut-off frequency set by the resistance value of the input resistor R5 and the capacitance of the feedback capacitor C1 from the output signal OUT1, and output an output signal OUT2 to the even multiple frequency attenuation unit 23.

The charge stored in the feedback capacitor C1 of the high frequency reduction unit 22 may be reset when the reset switch RST1 is enabled.

Then, when the first and second clock signals CK1 and CK2 are applied, the even multiple frequency attenuation unit 23 may reduce low-frequency noise lower than the frequency of the driving signal Tx by performing CDS on the output signal OUT2 of the high frequency reduction unit 22, and attenuate a frequency corresponding to an even multiple of the driving signal Tx.

Then, when the third clock signal CK3 is applied, the even multiple frequency attenuation unit 23 may accumulate the double-sampled signal in the feedback capacitor C3, and output the output signal OUT3 to the odd multiple frequency attenuation unit 24.

Then, when the fourth and fifth clock signals CK4 and CK5 are applied, the odd multiple frequency attenuation unit 24 may reduce low-frequency noise lower than the frequency of the driving signal Tx by performing CDS on the output signal OUT3 of the even multiple frequency attenuation unit 23, and attenuate a frequency corresponding to an odd multiple of the driving signal Tx.

Then, when the sixth clock signal CK6 is applied, the odd multiple frequency attenuation unit 24 may accumulate the double-sampled signal in the feedback capacitor C5, and output the accumulated signal to the selection unit 25.

Then, the selection unit 25 may select and output the output signal OUT4 of the odd multiple frequency attenuation unit 24 as a sensing signal OUT.

Figure 7:
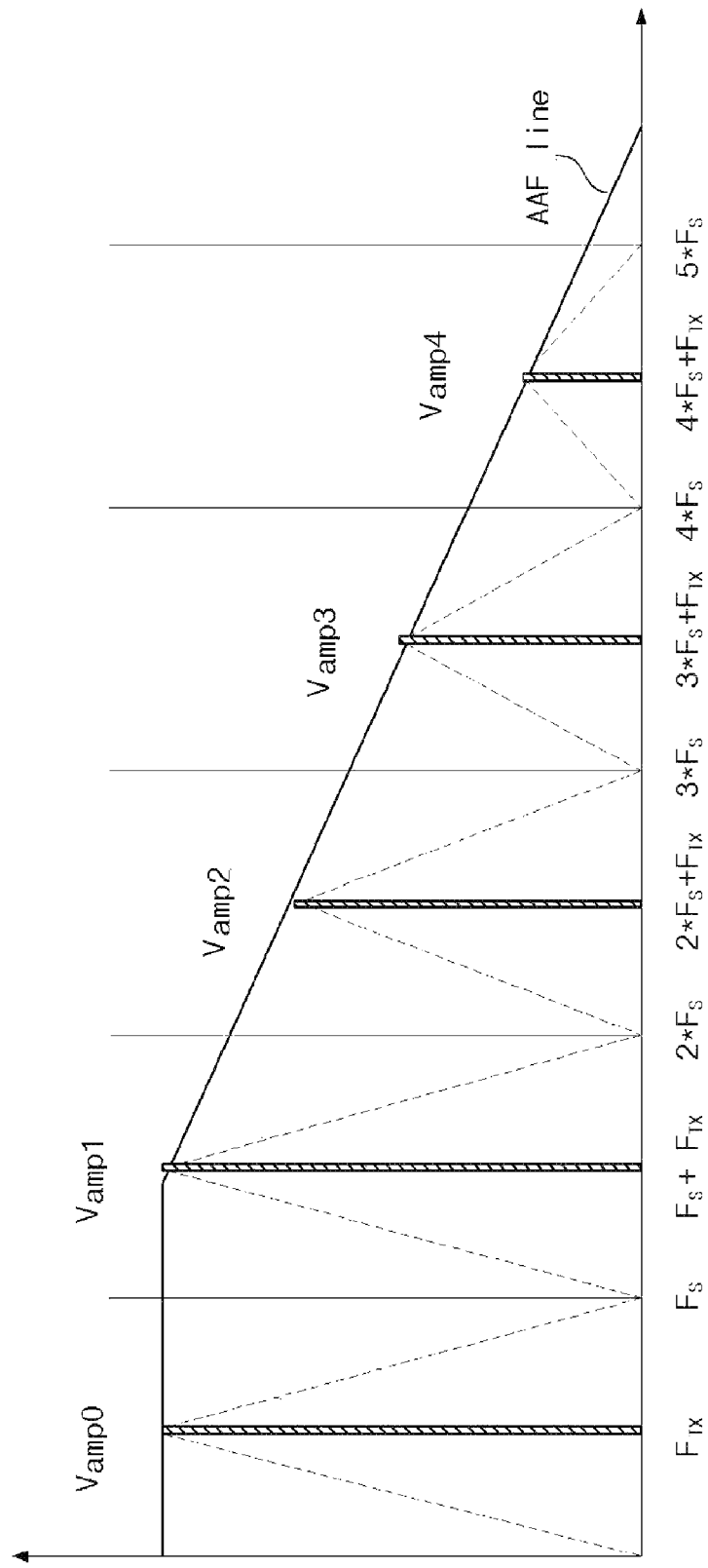
FIG. 7 is a diagram illustrating the frequency characteristic by the even multiple frequency attenuation unit of FIG. 3.

FIG. 7 is a diagram illustrating the frequency characteristic by the even multiple frequency attenuation unit of FIG. 3.

Referring to FIGS. 3 and 7, an AAF (Anti-Aliasing Filter) line indicates the characteristic of an LPF, determined by an R/C value. The high frequency reduction unit may reduce frequency components higher than the cut-off frequency set by the resistance of the input resistor R5 and the capacitance of the feedback capacitor C1.

The even multiple frequency attenuation unit 23 may reduce low-frequency noise lower than the frequency of the driving signal Tx by performing CDS on the signal stored in the capacitor C1 of the high frequency reduction unit 22, and attenuate a frequency corresponding to an even multiple frequency of the driving signal Tx.

That is, FIG. 7 illustrates the frequency characteristic in which low-frequency noise lower than the frequency of the driving signal Tx is reduced through CDS of the even multiple frequency attenuation unit 23 and a frequency corresponding to the even multiple of the driving signal Tx is attenuated, during the first sensing mode.

Equation 1 below is an equation for describing the interference of a noise frequency during the first sensing mode.

$$(n \cdot f_s \pm 1 \cdot f_{TX}) + f_{ns} \rightarrow A \cdot f_{ns}(1 < n < \infty) f_s = 2 \cdot f_{TX} \quad \text{[Equation 1]}$$

In Equation 1, $f_s$ represents a sampling frequency, $f_{Tx}$ represents the frequency of the touch panel driving signal Tx, and $f_{ns}$ represents a noise frequency.

Figure 8:
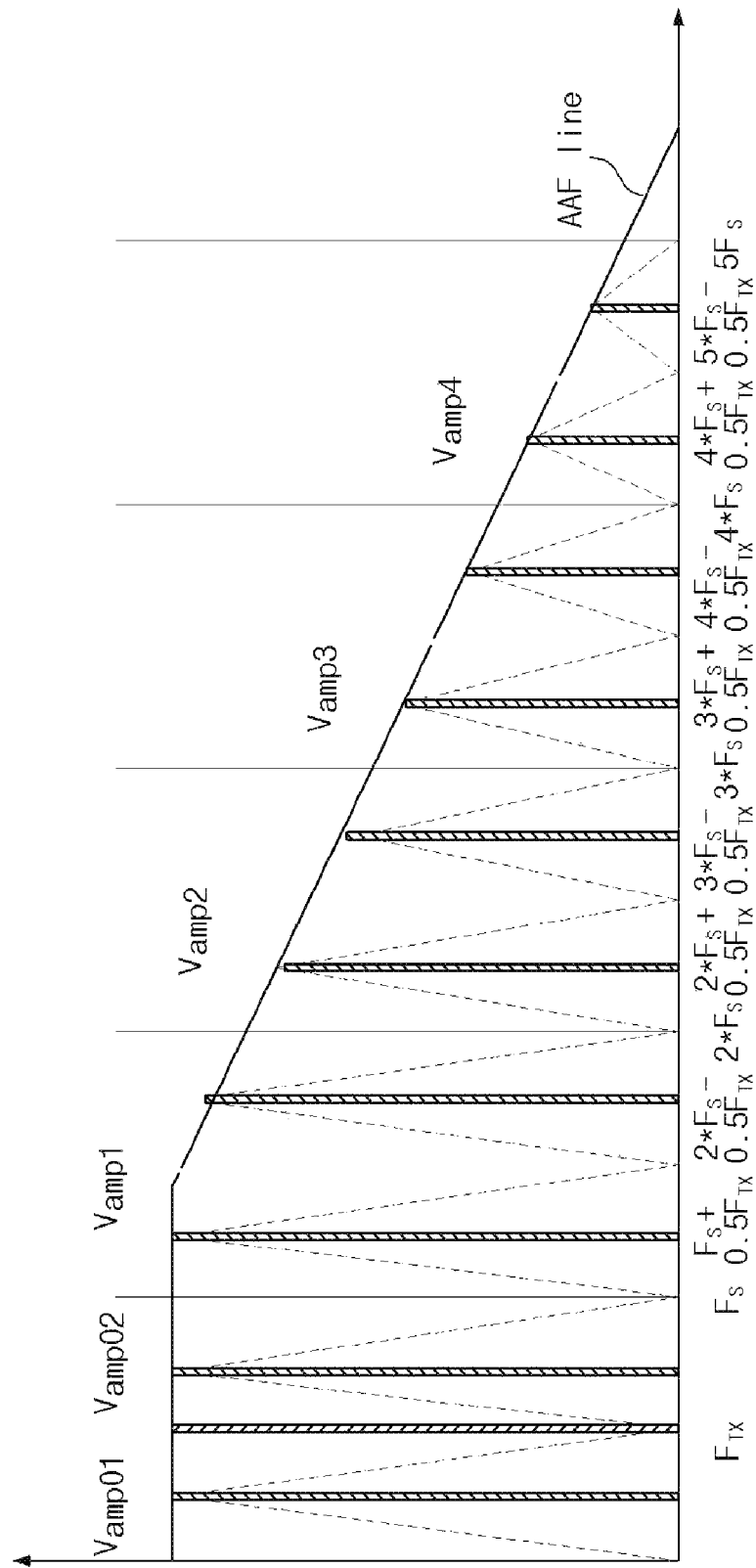
FIG. 8 is a diagram illustrating the frequency characteristic by the odd multiple frequency attenuation unit of FIG. 3.

FIG. 8 is a diagram illustrating the frequency characteristic by the odd multiple frequency attenuation unit of FIG. 3.

Referring to FIGS. 3 and 8, the odd multiple frequency attenuation unit 24 may reduce low-frequency noise lower than the frequency of the driving signal Tx by performing CDS on the output signal OUT3 of the even multiple frequency attenuation unit 23, and attenuate a frequency corresponding to an odd multiple frequency of the driving signal Tx. Then, the odd multiple frequency attenuation unit 24 may accumulate the output signal in the feedback capacitor and reduce white noise.

That is, FIG. 8 illustrates the frequency characteristic in which low-frequency noise lower than the frequency of the driving signal Tx is reduced through CDS of the odd multiple frequency attenuation unit 24 and a frequency corresponding to an odd multiple frequency of the driving signal Tx is attenuated, during the second sensing mode.

Equation 2 below is an equation for describing the interference of a noise frequency during the second sensing mode.

$$(n \cdot f_s \pm 0.5 \cdot f_{TX}) + f_{ns} \rightarrow A \cdot f_{ns}(1 < n < \infty) f_s = 2 \cdot f_{TX} \quad \text{Equation 2}$$

In Equation 2, $f_s$ represents a sampling frequency, $f_{Tx}$ represents the frequency of the touch panel driving signal Tx, and $f_{ns}$ represents a noise frequency.

Figure 9:
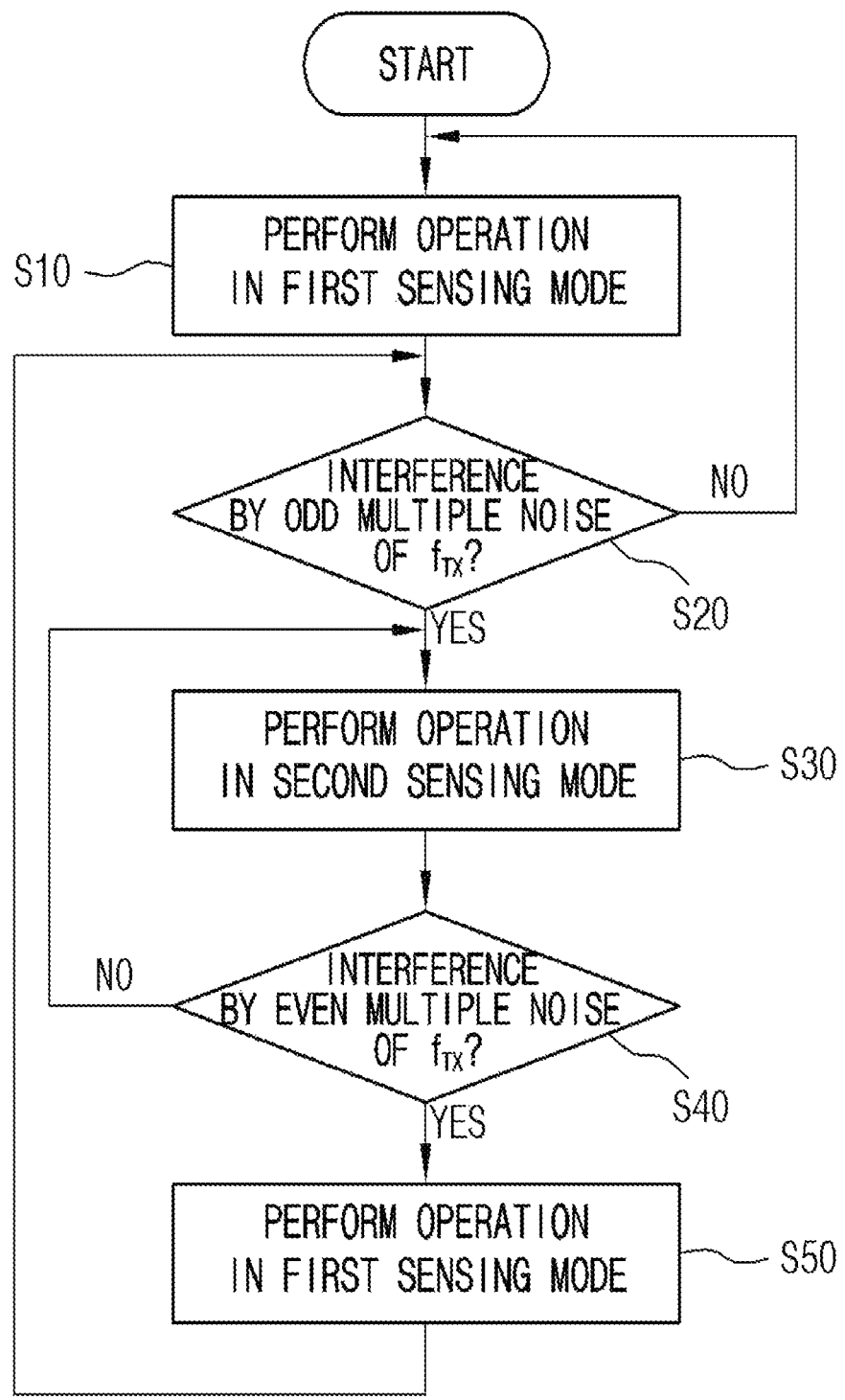
FIG. 9 is a flowchart illustrating a method for controlling a touch sensing device in accordance with an embodiment of the present invention.

FIG. 9 is a flowchart illustrating a method for controlling a touch sensing device in accordance with an embodiment of the present invention, and FIG. 10 is a diagram illustrating the phase changes of touch panel driving signals in accordance with the embodiment of the present invention.

Referring to FIGS. 1, 9, and 10, the method for controlling the touch sensing device in accordance with the embodiment of the present invention may drive the touch sensing device in the first sensing mode for attenuate an even multiple frequency of the touch panel driving signal Tx in a state where the frequency $f_{Tx}$ of the touch panel driving signal is set to 200 KHz and the sampling frequency $f_s$ is set to 400 KHz, at step S10.

Then, the control unit 30 may determine whether interference by an odd multiple frequency of the touch panel driving signal Tx occurs during the first sensing mode, at step S20.

At this time, when it is determined that the interference by the odd multiple frequency of the touch panel driving signal Tx occurred, the touch sensing device may be operated in the second sensing mode for attenuating an odd multiple frequency of the touch panel driving signal Tx, at step S30.

Then, the control unit 30 may determine whether interference by an even multiple frequency of the touch panel driving signal Tx occurs during the second sensing mode, at step S40.

At this time, when it is determined that the interference by the even multiple frequency of the touch panel driving signal Tx occurred, the touch sensing device may be operated in the first sensing mode at step S50.

The control unit 30 may analyze a sensing signal to determine the interference by the odd multiple frequency of the touch panel driving signal Tx or the interference by the even multiple frequency of the touch panel driving signal Tx.

First, the control unit 30 may control the touch panel driving unit 40 to apply the driving signal Tx to the touch panel 10.

At this time, the control unit 30 may analyze the sensing signal outputted from the touch sensing unit 20.

According to the analysis result, when the interference of noise corresponding to an even multiple of the driving signal frequency $f_{Tx}$ occurred, the control unit 30 may output the sensing control signal SEL for operating the touch sensing device in the first sensing mode to the touch sensing unit 20.

Furthermore, when the interference of noise corresponding to an odd multiple of the driving signal frequency $f_{Tx}$ occurred, the control unit 30 may output the sensing control signal SEL for operating the touch sensing device in the second sensing mode to the touch sensing unit 20.

As such, the control unit 30 may analyze the sensing signal during operation of the touch sensing unit 20, and attenuate the noise frequency by operating the touch sensing device in the first or second sensing module according to the analysis result.

When it is determined that noise interference still exists even though the touch sensing device is operated in the first or second sensing mode, the frequency $f_{Tx}$ of the driving signal and the sampling frequency fs may be changed to attenuate noise.

As described above, the embodiment of the present invention may not only reduce low-frequency noise lower than the touch panel driving signal, but also attenuate noise having a higher frequency than the driving signal.

Furthermore, the embodiment of the present invention may selectively attenuate noise having an even or odd multiple frequency of the touch panel driving signal.

Furthermore, the embodiment of the present invention may avoid noise interference and thus accurately recognize whether a user's touch occurred.

While various embodiments have been described above, it will be understood to those skilled in the art that the embodiments described are by way of example only. Accordingly, the disclosure described herein should not be limited based on the described embodiments.

What is claimed is:
1. A touch sensing device comprising:
a pre-processing unit configured to reduce common signal noise and frequency components higher than a preset cut-off frequency from a pair of signals outputted from a touch panel, in response to a driving signal; and
an attenuation unit configured to attenuate a frequency of a preset frequency region in an output signal of the pre-processing unit according to a sensing control signal, and output a sensing signal wherein the attenuation unit comprises:

an even multiple frequency attenuation unit configured to attenuate an even multiple frequency of the driving signal frequency by performing CDS (Correlated Double Sampling) on the output signal of the pre-processing unit;

an odd multiple frequency attenuation unit configured to attenuate an odd multiple frequency of the driving signal frequency by performing CDS on an output signal of the even multiple frequency attenuation unit; and a selection unit configured to select any one of output signals of the even multiple frequency attenuation unit and the odd multiple frequency attenuation unit according to the sensing control signal, and output the selected signal as the sensing signal.

2. The touch sensing device of claim 1, wherein the preset frequency region is set to a high-frequency region higher than the frequency of the driving signal.

3. The touch sensing device of claim 1, wherein the preset frequency region has a multiple relation with the frequency of the driving signal.

4. The touch sensing device of claim 1, wherein the preset frequency region is set to one or more of frequencies having even and odd multiple relations with the frequency of the driving signal.

5. The touch sensing device of claim 1, wherein the selection of the selection unit is controlled by the sensing control signal having a preset value or a value corresponding to the sensing signal.

6. A touch sensing device comprising:
a common signal noise reduction unit configured to reduce common signal noise from a pair of signals outputted from a touch panel in response to a driving signal;

a high frequency reduction unit configured to reduce frequency components higher than a preset cut-off frequency from an output signal of the common signal noise reduction unit; and an even multiple frequency attenuation unit configured to attenuate an even multiple frequency of the driving signal frequency by performing Correlated Double Sampling (CDS) on an output signal of the high frequency reduction unit;

an odd multiple frequency attenuation unit configured to attenuate an odd multiple frequency of the driving signal frequency by performing CDS on an output signal of the even multiple frequency attenuation unit; and a selection unit configured to select any one of output signals of the even multiple frequency attenuation unit and the odd multiple frequency attenuation unit according to a sensing control signal, and output the selected signal as the sensing signal.

7. The touch sensing device of claim 6, wherein the selection of the selection unit is controlled by the sensing control signal having a preset value or a value corresponding to the sensing signal.

8. The touch sensing device of claim 6, wherein the even multiple frequency attenuation unit comprises:
a CDS (Correlated Double Sampling) unit configured to reduce low-frequency noise lower than the frequency of the driving signal by performing CDS on an output signal of the high frequency reduction unit, and attenuate an even multiple frequency of the driving signal frequency;

an amplifier configured to accumulate an output signal of the CDS unit in a feedback capacitor; and a reset switch configured to reset the charge stored in the feedback capacitor.

9. The touch sensing device of claim 8, wherein the CDS unit comprises:
a first sampling switch having one terminal connected to an output stage of the high frequency reduction unit, and configured to be switched according to a first clock signal;

a second sampling switch having one terminal connected to an internal power supply and configured to be switched according to a second clock signal; and an input capacitor having one terminal connected to the other terminal of the first sampling switch and the other terminal connected to the other terminal of the second sampling switch, and configured to accumulate an output signal of the high frequency reduction unit when the first and second clock signals are enabled.

10. The touch sensing device of claim 6, wherein the odd multiple frequency attenuation unit comprises:
a CDS unit configured to reduce low-frequency noise lower than the frequency of the driving signal by performing CDS on an output signal of the even multiple frequency attenuation unit, and attenuate an odd multiple frequency of the driving signal frequency;

an amplifier configured to accumulate an output signal of the CDS unit in a feedback capacitor; and a reset switch configured to reset the charge stored in the feedback capacitor.

11. The touch sensing device of claim 10, wherein the CDS unit comprises:
a fourth sampling switch having one terminal connected to an output stage of the even multiple frequency attenuation unit, and configured to be switched according to a fourth clock signal;

a fifth sampling switch having one terminal connected to an internal power supply and configured to be switched according to a fifth clock signal; and an input capacitor having one terminal connected to the other terminal of the fourth sampling switch and the other terminal connected to the other terminal of the fifth sampling switch, and configured to accumulate an output signal of the even multiple frequency attenuation unit when the fourth and fifth clock signals are enabled.

12. A control device of a touch sensing device comprising:
a touch panel configured to output a received signal in response to a driving signal;

a touch sensing unit configured to attenuate a frequency of a preset frequency region from the received signal according to a sensing control signal, and output a sensing signal;

a touch panel driving unit configured to apply the driving signal to the touch panel according to a driving control signal; and a control unit configured to provide the driving control signal for changing a phase of the driving signal to the touch panel driving unit, and provide the sensing control signal to the touch sensing unit, wherein the touch sensing unit comprises:
an even multiple frequency attenuation unit configured to attenuate an even multiple frequency of the driving signal frequency by performing CDS on the received signal of the touch sensing unit;

an odd multiple frequency attenuation unit configured to attenuate an odd multiple frequency of the driving signal frequency by performing CDS on an output signal of the even multiple frequency attenuation unit; and a selection unit configured to select any one of output signals of the even multiple frequency attenuation unit and the odd multiple frequency attenuation unit according to the sensing control signal, and output the selected signal as the sensing signal.

13. The control device of the touch sensing device of claim 12, wherein the control unit is configured to generate the sensing control signal for determining whether to attenuate an even multiple frequency of the driving signal or both of an even multiple frequency and an odd multiple frequency of the driving signal, and provide the sensing control signal to the touch sensing unit.

14. The control device of the touch sensing device of claim 12, wherein the control unit is configured to further change the driving signal frequency and a sampling frequency.

* * * * *